(No Model.)
W. BUNDY.
SAW.
No. 388,822. Patented Sept. 4, 1888.
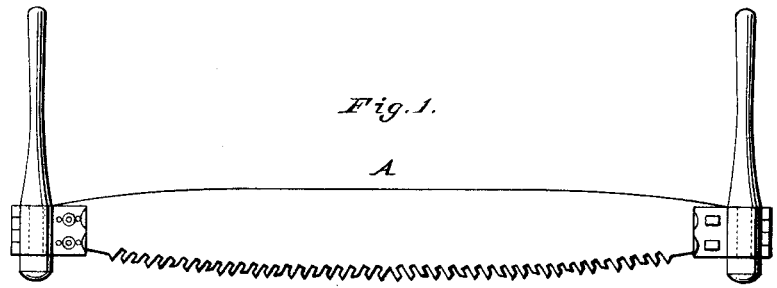
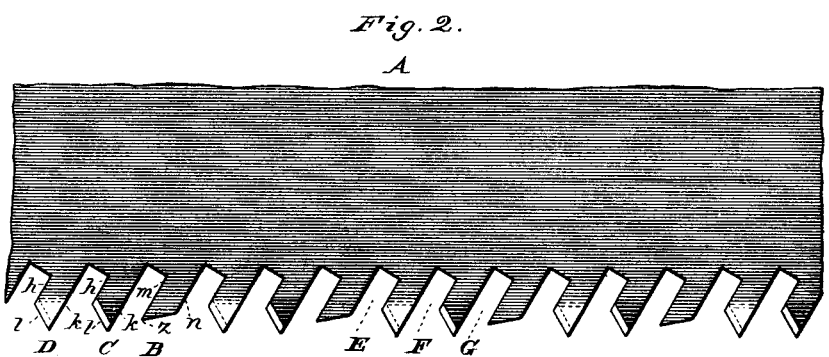
WITNESSES,
Villette Anderson.
Philip C. Masi.
INVENTOR.
Warren Bundy,
by E. W. Audron,
Attorney.

UNITED STATES PATENT OFFICE.

WARREN BUNDY, OF MINNESOTA CITY, MINNESOTA, ASSIGNOR OF TWO-THIRDS TO OTTO TROOST, OF SAME PLACE, AND GILBERT MONTAGUE, OF CHICAGO, ILLINOIS.

SAW.

SPECIFICATION forming part of Letters Patent No. 388,822, dated September 4, 1888.

Application filed April 27, 1887. Renewed February 27, 1888. Serial No. 265,471. (No model.)

*To all whom it may concern:*

Be it known that I, WARREN BUNDY, a citizen of the United States, resident at Minnesota City, in the county of Winona and State of Minnesota, have invented certain new and useful Improvements in Crosscut-Saws; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention and is a view of a crosscut-saw. Fig. 2 is a portion of a saw and shows a larger view of the teeth.

This invention has relation to crosscut-saws; and it refers particularly to the novel formation and combination of the teeth, as hereinafter set forth.

In the accompanying drawings, the letter A designates the blade, and B C D the teeth thereof, separated by the intervals E F G, in the order shown. The teeth C C and D D are cutting-teeth arranged in pairs, C D, as shown, the teeth C being set to the right and D to the left. B B are chisel-teeth, one such tooth following each pair of cutters, as shown. The teeth are inclined downward and forward from the body of the blade at an angle of about thirty degrees from the transverse vertical line of the blade. The teeth C and D are similar, except that one is beveled away on the left of its cutting-edge, while the tooth D is beveled away on the right. The teeth are formed with parallel front and rear edges extending from the blade and bounding the intervals E F G, as shown. Each cutting-tooth C D is formed with a short front edge, $h$, and a long rear edge, $k$, and with the oblique front cutting-edge, $l$, extending from the end of the short edge to that of the long edge, the angle of the cutting-edge $l$ being about thirty degrees from the vertical and its length about equal to that of the short edge $h$. These teeth C D shear the sides of the cut and are followed by the chisel-shaped cleaner B, which is formed with its front edge, $m$, extending farther from the blade than its rear edge, $n$, the bottom of the tooth being inclined at a low angle from a line in the length of the blade and having no side bevel, its dress being square, so that it presents a transverse cutting-front at $z$, adapted to clear the cut of chip and dust formed by the action of the preceding cutting-teeth D C. These teeth follow each other at distances which are equal, or nearly so, and the intervals E F G are therefore of about the same width.

As usually constructed it is preferred to throw the front $z$ of the cleaner-tooth B vertically below the inner end of the longer edge of the preceding tooth C, as shown. For double saws the teeth on one half the blade are formed to point toward the handle of that side, and on the other half toward the handle of the other side.

This saw is designed to do work with comparatively little power. It is readily filed on account of the formation of the tooth, only one tooth being filed at a time. The saw is designed to be used for an indefinite length of time, because as the teeth are worn away by work and filing the parallel formation of the edges of the intervals between them allows said intervals to be extended into the blade. This is especially important in crosscut-saws having drag or chisel teeth, as these teeth run out after usual filings, making it necessary to cut off all the old teeth and cut in new ones at a great waste of the blade and great expense. In my saw as the teeth are filed away they can be lengthened into the blade.

As this saw has only a single drag-tooth, there is nothing behind it to prevent the saw from going right into the work, while in double drag-tooth saws the saw does not hug or cut so readily on account of the runner behind.

Having described this invention, what I claim, and desire to secure by Letters Patent, is—

A crosscut-saw having the parallel edge acute-angle cutting-teeth C D and the parallel edge chisel-form teeth B, having the transverse cutting-front $z$, and shorter than the cutting-teeth, substantially as specified.

In testimony whereof I have affixed my signature in presence of two witnesses.

WARREN BUNDY.

Witnesses:
M. B. WEBBER,
AUGUSTUS BUSCH.